Oct. 10, 1961 P. C. EFROMSON ET AL 3,004,178
VIBRATION GENERATOR
Filed June 20, 1958 3 Sheets-Sheet 2
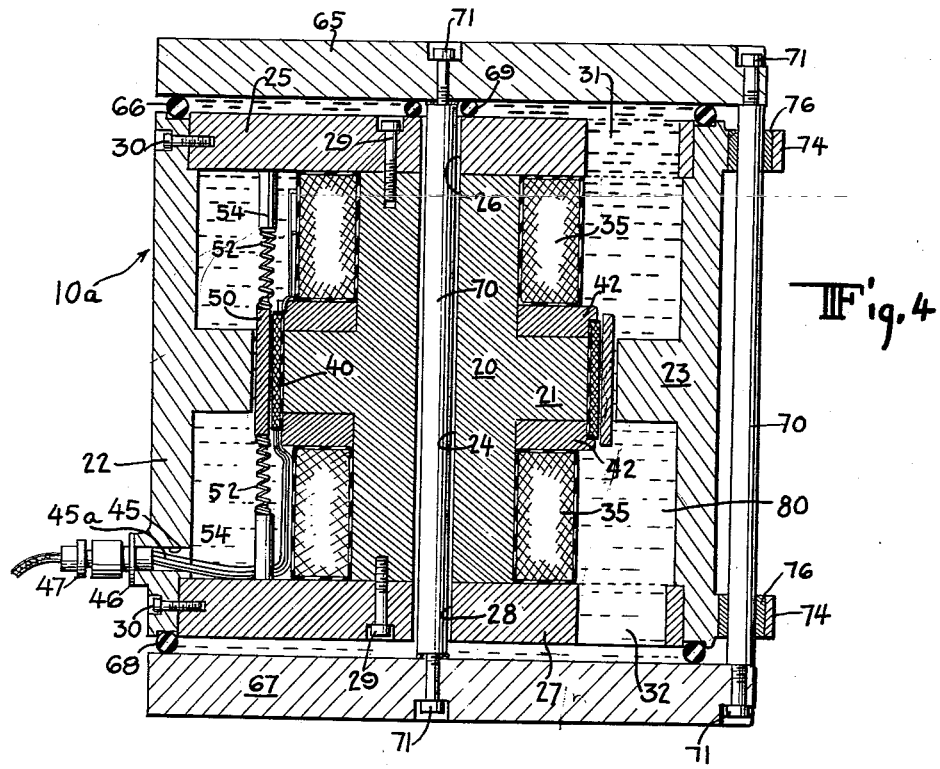
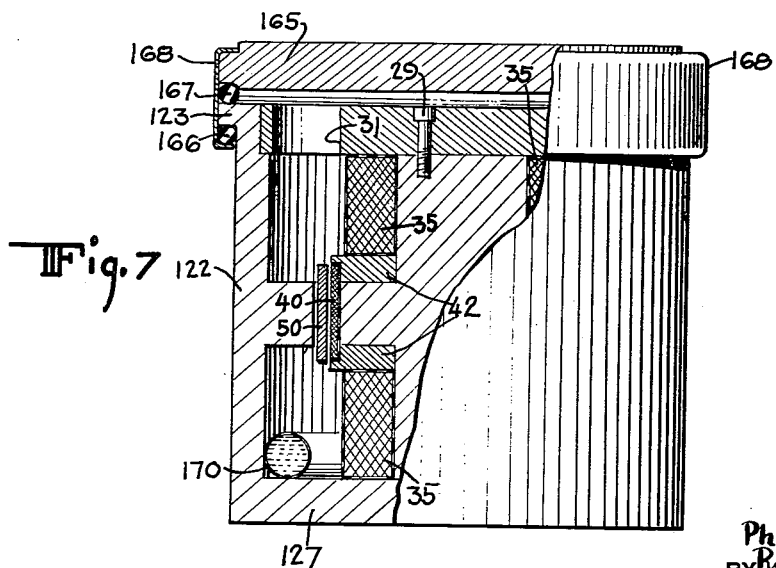
INVENTORS
Philip C. Efromson
BY Robert C. Lewis
George W. Price
ATTORNEY 3,004,178
VIBRATION GENERATOR
Philip C. Efromson, Winchester, and Robert C. Lewis, Boxford, Mass., assignors, by mesne assignments, to Ling-Temco Electronics, Inc., a corporation of Delaware
Filed June 20, 1958, Ser. No. 743,321
12 Claims. (Cl. 310—11)

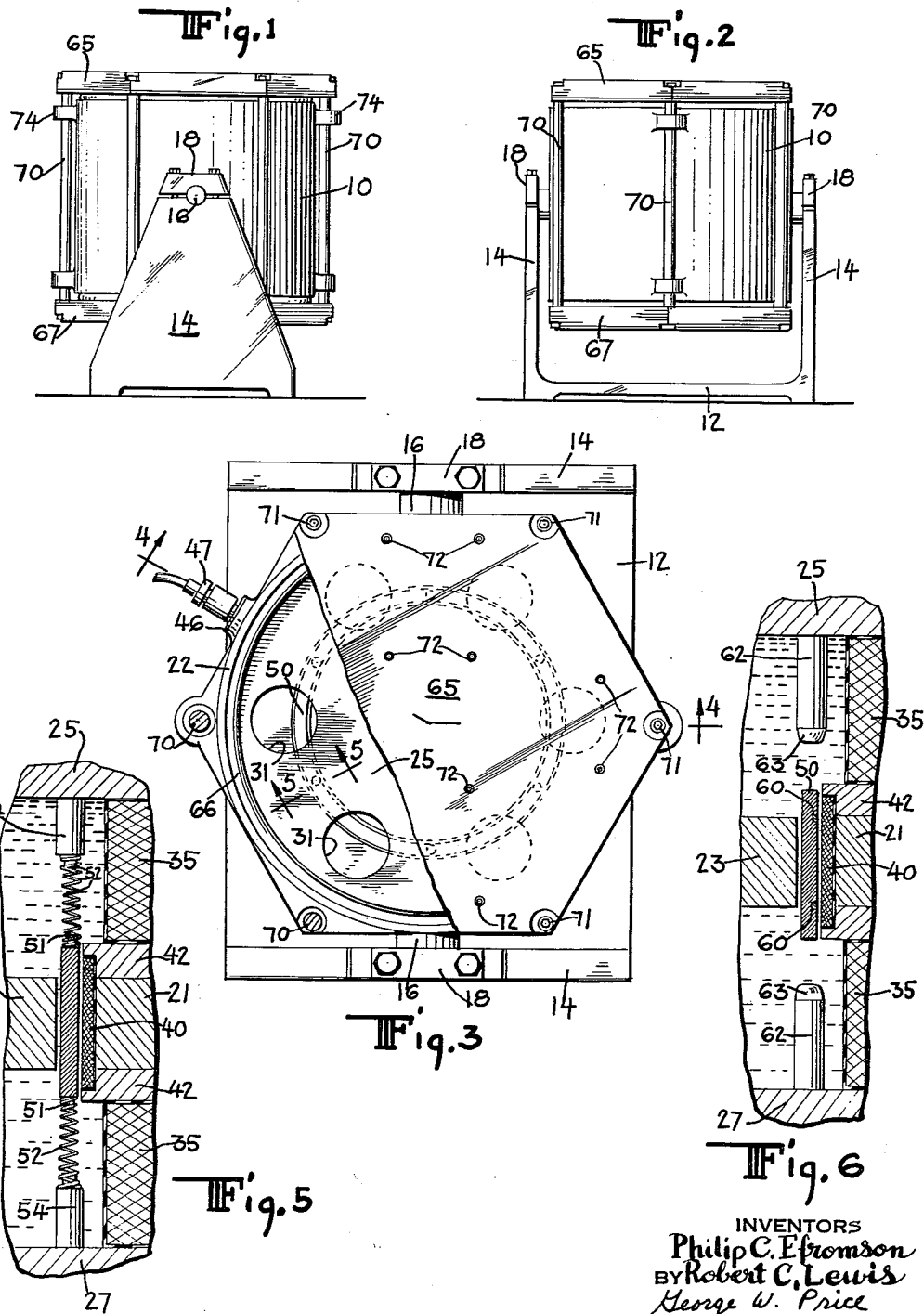

This invention relates to vibration generators such as are used for sonic and underwater sound vibration, processing, vibration testing, and other similar purposes where reciprocating forces are required.

As generally manufactured heretofore, such generators have comprised a core structure magnetized by a direct current energized field winding to produce a high magnetic flux concentration across an annular air gap in the structure. An armature coil is positioned within the air gap and energized from a source of alternating current thereby to impart a reciprocating movement to the coil and to an attached armature assembly. To insure effective transmission of the force generated by the coil to the point of connection to the load which is to be vibrated, it is usual to provide as rigid as possible a structure for the armature assembly which joins the coil to the load connection. This construction is quite satisfactory as regards performance, but it limits the force available at the load connection point to the maximum force generated by the coil.

In a broad aspect this invention contemplates a vibration generator having a magnetic core structure with a cylindrical or annular magnetic air gap wherein a high magnetic flux concentration is produced by means of a field coil energized from a direct current supply. A primary moving element or armature assembly comprises a ring made of electrically conductive but non-ferrous material located in the air gap with a small clearance to allow free axial motion, in which the force-producing current is generated by the transformer action of alternating current passed through a coil fixed to the coil structure and also located in the air gap. A secondary moving element or table, to which loads may be attached, comprises a plate spaced axially outward from the air gap end of the core structure or an extension thereof and secured thereto with an intervening resilient gasket located at or near the periphery of the plate so that the plate can move axially over a small distance while maintaining an air and fluid tight seal at the gasket. Force is transmitted from the primary armature to the table by means of liquid which entirely fills the cavity or cavities formed by unoccupied interior of the core structure, the clearances around the armature, and the space between the core structure and the table inside the gasket. Means are provided in the core structure to allow an effective change in volume of the cavity or cavities containing the field coil when the armature vibrates axially in the air gap. The armature acts like a sealed piston, the clearance around it in the air gap being such that the viscosity of the liquid in combination with the motion of the armature ring effectively seal the ring and prevent flow of fluid from one end of the ring to the other in a direction opposite to that of the ring motion. The motions of and forces upon the armature ring and the table are related by their relative projected areas within their common chamber, and comprises a simple hydraulic system.

In a specific aspect of the invention for use as a general purpose vibration generator the magnetic core structure comprises an outer shell having an intermediate inwardly extending flange which terminates in an annular magnetic gap and a central pole piece coaxially disposed with respect to the shell to form two annular cavities which are connected by the magnetic gap. Preferably, two tables are applied, one at each end of the core structure forming respective closures for the adjacent cavities. The two tables are inter-connected by means of a plurality of columnar members or struts maintaining the tables in rigid spaced relationship and constraining them to move together. It is convenient to provide guides attached to the core structure for these interconnecting members as a means for restraining the plates against lateral motion. The effective inner areas of the two tables within their respective gaskets are preferably made equal so that the hydraulic system is balanced and no means need be provided for change in chamber volume since this configuration provides that each chamber automatically maintains a constant volume. An added advantage of this aspect of the invention is that it permits large oscillatory pressure variations in the chambers without producing cavitation. If the tables are not made of the same effective areas or if only one table is used, other means such as a submerged gas filled bladder are used to maintain a constant volume. A further advantage is the increased magnetic flux in the air gap which is permitted by the use of a double core structure; we have found that this structure provides an increase in maximum power efficiency over that obtainable with a simple or one-sided core structure.

A further specific aspect of this invention comprises substantially the construction described above with the addition of coils of tubing located in the cavities containing the field coils. The ends of the tubing coils are brought out through sealed openings in the core structure shell to communicate with a source of fluid of controlled temperature, whereby heat dissipated by the coils within the vibration generator and also any heat absorbed by the body of the generator from its environment is carried off, thus adapting the generator to effective use in environments of elevated temperature.

These and other objects, aspects and features of the invention will be apparent from the following description of a specific embodiment which refers to drawings wherein:

FIG. 1 is a side elevation of one embodiment of a vibration generator;

FIG. 2 is a side elevation of the generator, viewed from a direction perpendicular to that of FIG. 1;

FIG. 3 is a plan view of the vibration generator shown in FIGS. 1 and 2, with a portion of the upper table broken away to show the core structure beneath;

FIG. 4 is a sectional view taken substantially on lines 4—4 of FIG. 3;

FIG. 5 is an enlarged fragmentary sectional view on lines 5—5 of FIG. 3, with the coupling liquid omitted;

FIG. 6 is a sectional view similar to FIG. 5 showing an alternative construction of the armature ring restraining means;

FIG. 7 is an elevational view with a portion broken away of a second embodiment.

Figure 8:
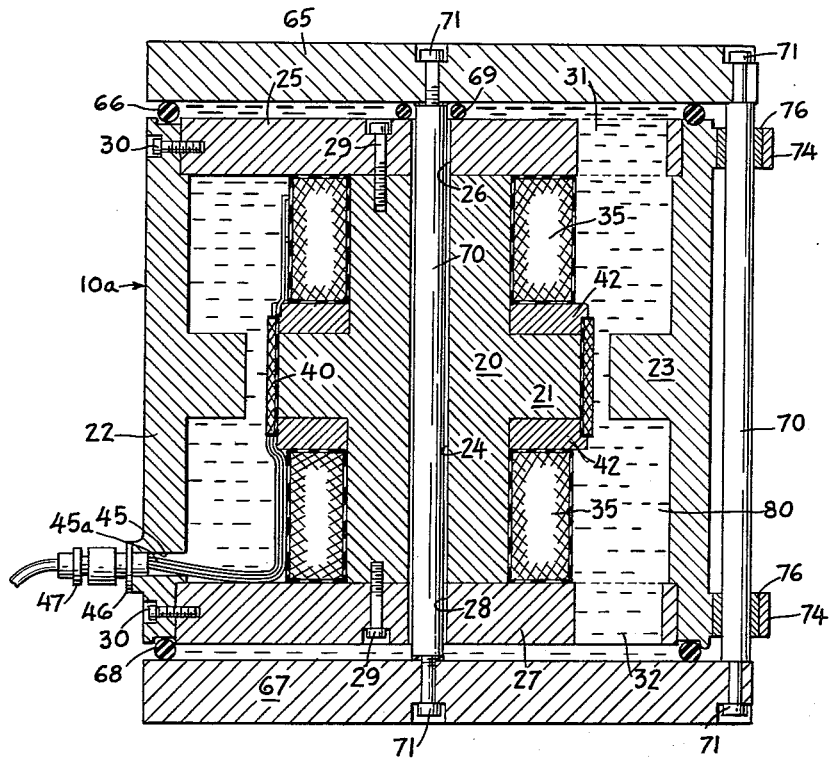
FIG. 8 is a sectional view of a further alternative construction wherein the armature ring and restraining means are eliminated.

As is shown in FIGS. 1 and 2, the vibration generator, chosen for purposes of illustration, comprises a substantially cylindrical core structure 10 of a low reluctance magnetic material. The core structure 10 is supported upon a base 12 having two integral upright brackets 14 which are located upon opposite sides of the base. At the top of each of the brackets 14 is provided a bearing surface wherein is journaled, respectively, one of the two oppositely disposed trunnions 16 which extend radially from the wall of the core structure 10. The trunnions 16 are maintained in contact with the bracket bearing surfaces by means of caps 18 which are bolted or otherwise secured to the respective brackets 16.

As is best shown in FIG. 4, the core structure 10, which is of a low magnetic reluctance material, comprises a central pole piece 20 having an outwardly extending flange 21 located midway between its ends, a ring or shell 22 having an inwardly extending flange 23 midway between its ends, and end plates 25 and 27 attached to the opposite ends of both the pole piece 20 and the shell 22. A cylindrical annular air gap is formed by the peripheral wall of this flange 21 and the internal wall of the aperture of the flange 23; two symmetrical low reluctance paths are provided by the flanges 21, the pole piece 20, the end plates 25 and 27, the shell 22, and the flange 23. End plates 25 and 27 are secured to the pole piece 20 and the shell 22 respectively by bolts 29 and 30. Six equally spaced apertures 31 and 32 are provided in end plates 25 and 27 respectively for a purpose which will appear hereinafter. Within the two annular cavities formed in the magnetic core structure, two field windings 35 are positioned respectively to encircle the central pole piece 20. In the particular embodiment illustrated, aligned central holes 24, 26 and 28 are provided in the pole 21 and the end plates 25 and 27, respectively.

A driver coil 40 is positioned within the air gap in close relationship to the peripheral wall of the flange 21 and extends somewhat beyond the ends of the flange 21, and is secured in place by means of retainers 42 which are made of non-ferrous and preferably of non-metallic material, and which are in turn attached to the face of flange 21 by bolts (not shown). The driver coil 40 is encapsulated in an insulating resin so that its outer cylindrical surface may be molded or machined to provide a smooth surface of accurate and uniform diameter.

Electrical leads 45a from the upper field winding 35 are carried to the lower cavity of the core structure inside of the driver coil 40 through a grove in the periphery of the flange 21, and are hermetically sealed therein. These leads 45a, together with similar leads (not shown) from the lower field winding 35 and the driver coil 40, are led through an aperture 45 in the wall of the shell 22 to a connector 46, which is internally pressure-tight and is tightly sealed against the shell 22. A cable and mating connector 47 provide electrical connection to the conventional power sources (not shown).

An armature 50 comprising a simple ring of material having high electrical conductivity such as copper or aluminum is positioned in the air gap with very close clearances between the inner wall of the aperture in the flange 23 of the core structure and the outer wall of the driver coil 40, with freedom to move in an axial direction. As is better shown in sectional view FIG. 5, one manner of maintaining the armature ring 50 within the air gap with compliance to move axially is to provide three or more pairs of opposed coil springs 52, one end of each of which fits over and is seated upon a pin or projection 51 extending from the corresponding ends of the armature ring 50 and whose opposite ends fit over similar projections on the ends of posts or bases 54 which may be integral with or attached to end plates 25 and 27 of the core structure 10. The springs 52 are proportioned and precompressed in the position shown in FIGS. 4 and 5 so that when the armature ring 50 moves downward, its limiting position is determined by the lower spring 52 having all its coils solidly collapsed together, whereas the upper spring 52 will not have extended quite to its free or unloaded condition. Conversely, the upward travel of the armature ring 50 is limited by the compression together of the coils of the upper spring 52 whereas the lower spring is in an extended condition.

An alternative method of providing axial centering of the armature within the air gap is illustrated in FIG. 6. The armature 50 is modified by the addition of two small rings 60 of low magnetic reluctance material such as iron, set into internal circumferential grooves in the armature 50 and secured therein by staking or other suitable means. The rings 60 need not be continuous but may be segmented, provided that the magnetic material is uniformly distributed around the circumference of the armature. The axial spacing of the rings 60 is substantially equal to the axial thickness of the flanges 21 and 23, and when the field windings are energized and magnetic flux is thereby produced in the air gap, the rings 50 are drawn toward the position shown from any axially displaced position either upward or downward, and accordingly impel the armature ring 50 toward the central position shown, at the same time allowing movement of the armature in the axial direction. Three or more sets of bosses 62 project inwardly from end plates 25 and 27 and carry bumpers 63 of elastic material attached to their opposing ends to provide effective limits to the axial travel of armature 50 and prevent it from entirely escaping from the air gap when the field is de-energized.

A substantially rigid table 65 is positioned adjacent to the upper end of the core structure 10 and is maintained in spaced relationship therefrom by means of a ring-shaped compliant gasket 66. A similar table or plate 67 is correspondingly positioned at the opposite end of the core structure and spaced by means of gasket 68. Gaskets 66 and 68 rest in shallow circumferential grooves formed in the ends of shell 22 and are thereby restrained from radial displacement.

A third resilient gasket 69 is positioned at the edge of hole 26 in table 25 to provide a seal between the space inside the table 65 and the space inside the plate 67. Table 65 and plate 67 are interconnected by means of a plurality of columnar members such as the elongated struts 70 which abut the opposing surfaces of the table and plate and are secured thereto by means of bolts 71. In the particular embodiment illustrated, one strut 70 passes thru the central hole 24 of the core structure 10 and the remainder are positioned external to the core structure and at equal circumferential spacing thereabout whereby the table 65, plate 67 and struts 70 comprise a rigid cagelike structure all parts of which are constrained to move together. The length of struts 70 is such that when bolts 71 are tightened to bring the table and plate against the ends of the struts, gaskets 66, 68 and 69 are compressed sufficiently to insure a hermetical seal under all conditions of axial displacement of table 65 and plate 67 through a small predetermined range. Table 65 is adapted to the attachment of various test loads or other objects (not shown) to be vibrated for test or other purposes by the provision of a plurality of internally threaded holes 72 in the outwardly facing surface, as shown in FIG. 3. These holes are limited in depth so that they do not pass entirely through the table. Similar holes may be provided in plate 67 if desired, whereby additional test loads may be vibrated simultaneously.

Two of the opposite struts 70 pass through openings in projections 74 which as shown in FIGS. 1 and 4 are formed integrally with shell 22. Bushings 76 are disposed within openings 74 and to encircle the struts 70 to provide restraint against lateral displacement of the struts and consequently of the table 65, plate 67 and strut assembly, while permitting movement in the axial direction. In one construction, bushings 76 are made of elastic material such as rubber, bonded to the walls of the opening 74 and fitting tightly around struts 70. In another alternative construction, a rigid bushing 76 of low-friction material is pressed into opening 74 and fits with a small running clearance around strut 70.

All the internal cavities of the vibration generator are completely filled with a suitable liquid 80 which in this embodiment is a conventional hydraulic fluid or silicone fluid, preferably of low viscosity but of basically oily nature. The volume filled includes the two annular cavities containing the field windings, the openings 31 and 32 in the end plates 25 and 27, the spaces between the core structure and the table 65 and the plate 67 respectively, the air gap clearances around the armature ring 50 and clearances about the central strut 70. It is essential to the proper operation that all air or gas be excluded from the internal chambers, so that there are no compressible fluid within the generator and it comprises a totally enclosed hydraulic system.

In operation, direct current is supplied to the field windings 35 whereby a concentrated magnetic flux of radial direction is produced in the magnetic air gap. Alternating current is then supplied to driver coil 40. By electromagnetic induction, a circulating alternating current is produced in the armature ring 50, which reacts with the radial magnetic flux to generate an alternating force acting upon the armature ring in an axial direction. As the armature ring 50 moves in and out of the cavities in response to the alternating force, it displaces liquid in that cavity of the core structure toward which it moves. Since the clearance around the armature 50 is proportioned to prevent flow of the liquid past it in a direction opposite to that of the armature motion, and since the liquid is substantially incompressible, the table 65 (or 67, as the case may be) is compelled to move axially outward to compensate for the volume of fluid displaced. The opposite table is compelled to move inward a like amount by virtue of the struts 70 connecting them, and thereby displaces a like amount of the fluid which exactly occupies the volume in that cavity vacated by the armature.

Since motion of the armature 50 displaces a volume of fluid equal to the product of the axial dimension of its travel and its cross-sectional area, the amount of axial movement of the table assembly will be proportioned to the armature motion by the inverse ratio of the area of the table exposed to the liquid to the armature cross-section area. Since the pressure developed within the cavity into which the armature is impelled is uniform, the force applied to the table is related to the force generated by the armature in the same ratio, applied directly.

It is apparent from the description of this embodiment of the vibration generator that very large vibratory forces may be produced at the table with a relatively small force primary transducer, with consequent saving in cost of construction and power; that is construction results in a generator whose moving parts are few and of extreme simplicity; that its operation is such as to be relatively unaffected by the type of environment to which it may be subjected; and that it is well adapted to the vibration of loads substantially fluid in nature, being capable of complete immersion therein.

It should be noted that the general arrangement of the vibration generator structure described can be adapted, for special applications, to embody an alternative construction resulting in the complete elimination of all internal moving parts. This construction, which is illustrated in FIG. 8, insofar as the core structure 10a is concerned is the same as the core structure 10 of the embodiment illustrated in FIG. 4. Also similar in construction and operation are electrical coils 35 and 40 and associated elements which have been designated by the same numerals in FIG. 8 as in FIG. 4. In the embodiment of FIG. 8, the armature 50, the restraining springs 52 and support posts 54 shown in FIG. 4 are dispensed with and an electrically conducting liquid such as mercury is substituted for the hydraulic fluid mentioned above. The mercury in addition to occupying the cavities and clearances in the core structure as described above also fills the space normally occupied by the armature. Since the mercury is electrically conductive, that portion of its volume lying in the concentrated magnetic flux region of the air gap adjacent the driver coil 40 will have induced in it electric currents which will produce forces tending to displace such portion in an axial direction. Thus the fluid system shown in FIG. 8 has a virtually integral armature which is self-sealing, requires no guide nor restraint, and possesses maximum reliability.

In FIG. 7 is shown another embodiment of the invention that is generally similar in construction and operation to that shown in FIGS. 1 to 4 with the corresponding elements designated by the same number but which has a modified magnetic structure and a single table 165 located at one end thereof. The struts 70 and second table 67 shown in FIG. 4 are eliminated and the table 165 consists of a cylindrical plate having a rabbet about the periphery at its upper end which is engaged by the upper inwardly turned lip of a restraining ring or band 168. The band 168 is also provided with a lower inwardly lip which overlaps an outwardly projecting flange 123 at the top of the shell 122 so that the upward travel of the table 165 is limited by the compressing of an O-ring gasket 166 between the flange and the lip. A second ring gasket 167 is interposed between the top of the flange 123 and the scarfed lower edge of the table 165 to insure a hermetical seal between the table and the shell. To compensate for the change in volume of the lower cavity, which is completely closed by a solid end plate 127, as the armature ring 50 is electromagnetically moved upwardly in a manner analogous to that described heretofore, a bladder 170 of a resilient material is inserted in the lower cavity. The bladder 170 is inflated by an inert gas to the torus shape shown in FIG. 7 and as pressure is increased or decreased in the cavity the bladder expands or contracts accordingly so that no void is established in the hydraulic fluid by the movement of the armature ring 50.

It should be understood that the present disclosure is for the purpose of illustration only and that this invention includes all modifications and equivalents which fall within the scope of the appended claims.

We claim:

1. A vibration generator comprising a magnetic structure having a cavity therein and a magnetic gap connecting with the cavity across which gap a unidirectional flux is established, a liquid filling the cavity, a load carrying table movable with respect to the magnetic structure and forming one wall of the cavity, compliant sealing means interposed between the magnetic structure and the table for hermetically sealing the liquid in the cavity, and electromagnetic means associated with the magnetic gap for cyclically varying the pressure of the liquid in the cavity whereby a corresponding vibratory motion is hydraulically imparted to the table.

2. A vibration generator comprising a magnetic structure having a liquid filled cavity therein and a magnetic gap connecting with the cavity across which gap a unidirectional flux is established, a load carrying table movable with respect to the magnetic structure and forming one wall of the cavity, sealing means interposed between the magnetic structure and the table for hermetically sealing the liquid in the cavity, an armature disposed in the magnetic gap to move in and out of the cavity, and electromagnetic means for setting up alternating flux which interacts with the unidirectional flux in the magnetic gap to impart a reciprocating movement to the armature whereby a corresponding motion is hydraulically transmitted to the table.

3. A vibration generator comprising a magnetic structure having a liquid filled cavity therein and a magnetic gap connecting with the cavity across which gap a unidirectional flux is established, a load carrying table movable with respect to the magnetic structure and forming one wall of the cavity, sealing means interposed between the magnetic structure and the table for hermetically sealing the liquid in the cavity, a ring of electrically conducting material forming an armature disposed in the magnetic gap, restraining means for limiting the movement of the ring in and out of the cavity so as to maintain the ring in the magnetic gap, and electromagnetic means for setting up eddy currents in the ring whose associated magnetic field interacts with the unidirectional flux in the magnetic gap to impart a reciprocating movement to the ring whereby a corresponding motion is hydraulically transmitted to the table.

4. A vibration generator comprising a magnetic structure having a liquid filled cavity therein and a magnetic gap connecting with the cavity across which gap a unidirectional flux is established, a load carrying table movable with respect to the magnetic structure and forming one wall of the cavity, sealing means interposed between the magnetic structure and the table for hermetically sealing the liquid in the cavity, a ring of electrically conducting material forming an armature disposed in the magnetic gap, restraining means including a plurality of pairs of springs equally spaced about the ring, the springs of each pair being interposed respectively between opposite ends of the ring and the adjacent portions of the magnetic structure for limiting the movement of the ring in and out of the cavity, and electromagnetic means for setting up eddy currents in the ring whose associated magnetic field interacts with the unidirectional flux in the magnetic gap to impart a reciprocating movement to the ring whereby a corresponding motion is hydraulically transmitted to the table.

5. A vibration generator comprising a magnetic structure having a liquid filled cavity therein and a magnetic gap connecting with the cavity across which gap a unidirectional flux is established, a load carrying table movable with respect to the magnetic structure and forming one wall of the cavity, sealing means interposed between the magnetic structure and the table for hermetically sealing the liquid in the cavity, a ring of electrically conducting material forming an armature disposed in the magnetic gap, restraining means including ferromagnetic elements symmetrically embedded in the ring for centering the ring in the magnetic gap and a plurality of bumpers carried by the magnetic structure alternatively to engage the opposite ends of the ring for limiting the movement of the ring in and out of the cavity so as to maintain the ring in the magnetic gap, and electromagnetic means for setting up eddy currents in the ring whose associated magnetic field interacts with the unidirectional flux in the magnetic gap to impart a reciprocating movement to the ring whereby a corresponding motion is hydraulically transmitted to the table.

6. A vibration generator comprising a magnetic structure having a liquid filled cavity therein and a magnetic gap connecting with the cavity across which gaps a unidirectional flux is established, a load carrying table movable with respect to the magnetic structure and forming one wall of the cavity, sealing means interposed between the magnetic structure and the table for hermetically sealing the liquid in the cavity, a ring of electrically conducting material forming an armature disposed in the magnetic gap, restraining means for limiting the movement of the ring in and out of the cavity so as to maintain the ring in the magnetic field, an electrical winding positioned in the magnetic gap adjacent the ring for setting up eddy currents in the ring whose associated magnetic field interacts with the unidirectional flux in the magnetic gap to impart a reciprocating movement to the ring whereby a corresponding motion is hydraulically transmitted to the table.

7. A vibration generator comprising a magnetic structure including an outer cylindrical shell having an inwardly extending flange terminating in an annular magnetic gap and a central pole piece coaxially disposed with respect to the shell to form an annular cavity, a field winding positioned in the cavity for establishing a unidirectional magnetic flux across the magnetic gap, a liquid filling the cavity and gap, a load carrying table movable with respect to the magnetic structure and forming a closure wall for the cavity, sealing means interposed between the magnetic structure and the table for hermetically sealing the cavity, an armature disposed in the magnetic gap to move in and out of the cavity to vary the effective volume thereof, and electromagnetic means for imparting a reciprocating movement to the armature whereby a corresponding motion is hydraulically transmitted to the table.

8. A vibration generator comprising a magnetic structure including an outer cylindrical shell having an intermediate inwardly extending flange terminating in an annular magnetic gap and a central pole piece coaxially disposed with respect to the shell to form two annular cavities located upon the opposite sides of the flange and interconnected by the magnetic gap, field windings positioned in the cavities for establishing a unidirectional magnetic flux across the magnetic gap, a liquid filling the gap and cavities, a load carrying table movable with respect to the magnetic structure and forming a closure wall for one of the cavities, sealing means interposed between the magnetic structure and the table for hermetically sealing the corresponding cavity, an armature disposed in the magnetic gap to move in and out of the cavities to vary the effective volumes thereof, electromagnetic means for imparting a reciprocating movement to the armature whereby a corresponding motion is hydraulically transmitted to the table, and means associated with the other cavity to compensate for the change in its effective volume as the armature moves in and out.

9. A vibration generator comprising a magnetic structure including an outer cylindrical shell having an intermediate inwardly extending flange terminating in an annular magnetic gap and a central pole piece coaxially disposed with respect to the shell to form two annular cavities located upon the opposite sides of the flange and interconnected by the magnetic gap, field windings positioned in the cavities for establishing a unidirectional magnetic flux across the magnetic gap, a liquid filling the gap and cavities, a load carrying table movable with respect to the magnetic structure and forming a closure wall for one of the cavities, sealing means interposed between the magnetic structure and the table for hermetically sealing the corresponding cavity, an armature disposed in the magnetic gap to move in and out of the cavities to vary the effective volumes thereof, electromagnetic means for imparting a reciprocating movement to the armature whereby a corresponding motion is hydraulically transmitted to the table, and a gas filled flexible bladder disposed in the other cavity to compensate for the change in its effective volume as the armature moves in and out.

10. A vibration generator comprising a magnetic structure including an outer cylindrical shell having an intermediate inwardly extending flange terminating in an annular magnetic gap and a central pole piece coaxially disposed with respect to the shell to form two annular cavities located upon the opposite sides of the flange and interconnected by the magnetic gap, field windings positioned in the cavities for establishing a unidirectional magnetic flux across the magnetic gap, a liquid filling the gap and cavities, two spaced parallel load carrying tables movable with respect to the magnetic structure and forming closure walls for the respective cavities, a plurality of struts connecting the tables, sealing means interposed between the magnetic structure and the tables for hermetically sealing the corresponding cavities, an armature disposed in the magnetic gap to move in and out of the cavities to varying effective volumes thereof, and electromagnetic means for imparting a reciprocating movement to the armature whereby a corresponding motion is hydraulically transmitted to the tables.

11. A vibration generator comprising a magnetic structure including an outer cylindrical shell having an intermediate inwardly extending flange terminating in an annular magnetic gap and a central pole piece coaxially disposed with respect to the shell to form two annular cavities located upon the opposite sides of the flange and interconnected by the magnetic gap, field windings positioned in the cavities for establishing a unidirectional magnetic flux across the magnetic gap, an electrically conducting liquid filling the magnetic gap and cavities, a load carrying table movable with respect to the magnetic structure and forming a closure wall for one of the cavities, sealing means interposed between the magnetic structure and the table for hermetically sealing the corresponding cavity, and electromagnetic means for inducing the flow of an electrical current in the portion of the fluid disposed in the magnetic gap to impart a movement thereto axially of the gap whereby a corresponding motion is hydraulically transmitted to the table.

12. A vibration generator comprising a magnetic structure having a cavity therein and a magnetic gap connecting with the cavity across which gap a unidirectional flux is established, an electrically conducting liquid filling the cavity and the gap, a load carrying table movable with respect to the magnetic structure and forming one wall of the cavity, sealing means interposed between the magnetic structure and the table for hermetically sealing the liquid in the cavity, and electromagnetic means for inducing the flow of an electrical current in the portion of the fluid disposed in the magnetic gap to impart a movement thereto axially of the gap whereby a corresponding motion is hydraulically transmitted to the table.

References Cited in the file of this patent

UNITED STATES PATENTS

| | | |
|---|---|---|
| 799,064 | Kowsky | Sept. 12, 1905 |
| 853,789 | Holden | May 14, 1907 |
| 902,106 | Northrup | Oct. 27, 1908 |
| 2,241,620 | Shoeld | May 13, 1941 |
| 2,262,352 | Arnold | Nov. 11, 1941 |
| 2,350,938 | Sparrow | June 6, 1944 |
| 2,402,544 | Foulds | June 25, 1946 |
| 2,652,607 | Young | Sept. 22, 1953 |
| 2,812,716 | Gray | Nov. 12, 1957 |
| 2,855,850 | Morris | Oct. 14, 1958 |

FOREIGN PATENTS

| | | |
|---|---|---|
| 427,012 | Great Britain | Jan. 9, 1934 |